United States Patent
Huh et al.

(10) Patent No.: US 11,644,642 B2
(45) Date of Patent: May 9, 2023

(54) OPTICAL IMAGING SYSTEM

(71) Applicant: Samsung Electro-Mechanics Co., Ltd., Suwon-si (KR)

(72) Inventors: Jae Hyuk Huh, Suwon-si (KR); Jae Hyun Baik, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 644 days.

(21) Appl. No.: 16/778,496

(22) Filed: Jan. 31, 2020

(65) Prior Publication Data
US 2020/0271897 A1   Aug. 27, 2020

(30) Foreign Application Priority Data

Feb. 21, 2019   (KR) .................. 10-2019-0020453
Jul. 29, 2019   (KR) .................. 10-2019-0091493

(51) Int. Cl.
*G02B 9/64*   (2006.01)
*G02B 27/00*   (2006.01)
(Continued)

(52) U.S. Cl.
CPC ............ *G02B 9/64* (2013.01); *G02B 27/0025* (2013.01); *G02B 3/04* (2013.01); *G02B 13/18* (2013.01)

(58) Field of Classification Search
CPC ........ G02B 9/64; G02B 27/0025; G02B 3/04; G02B 13/18; G02B 13/0045
(Continued)

(56) References Cited

U.S. PATENT DOCUMENTS 6,043,938 A     3/2000 Ogasawara
9,063,318 B2 *  6/2015 Ishizaka ............. G02B 13/0045
(Continued)

FOREIGN PATENT DOCUMENTS

CN    204028445 U    12/2014
CN    104297905 A     1/2015
(Continued)

OTHER PUBLICATIONS

Chinese Office Action dated May 10, 2022, in counterpart Chinese Patent Application No. 202010123605.5 (9 pages in English and 9 pages in Chinese).
(Continued)

*Primary Examiner* — James R Greece
(74) *Attorney, Agent, or Firm* — NSIP Law

(57) ABSTRACT

An optical imaging system includes a first lens, a second lens, a third lens, a fourth lens, a fifth lens, a sixth lens, and a seventh lens sequentially disposed in ascending numerical order along an optical axis of the optical imaging system from an object side of the optical imaging system toward an imaging surface of an image sensor, wherein a conditional expression f/f2+f/f3<−0.4 is satisfied, where f is a focal length of the optical imaging system, f2 is a focal length of the second lens, and f3 is a focal length of the third lens, and a conditional expression TTL/(2*IMG HT)<0.69 is satisfied, where TTL is a distance along the optical axis from an object-side surface of the first lens to the imaging surface of the image sensor, and IMG HT is one-half of a diagonal length of the imaging surface of the image sensor.

15 Claims, 10 Drawing Sheets

(51) Int. Cl.
  *G02B 13/18* (2006.01)
  *G02B 3/04* (2006.01)

(58) Field of Classification Search
  USPC .................. 359/708, 713, 755, 756, 757
  See application file for complete search history.

(56) References Cited

U.S. PATENT DOCUMENTS

| | | | |
|---|---|---|---|
| 9,116,329 B2* | 8/2015 | Fukaya | G02B 13/0045 |
| 9,256,055 B2* | 2/2016 | Ishizaka | G02B 9/64 |
| 9,279,963 B2* | 3/2016 | Ishizaka | G02B 27/0025 |
| 9,638,896 B2* | 5/2017 | Fukaya | G02B 9/64 |
| 9,706,093 B2 | 7/2017 | Chen | |
| 9,835,822 B2* | 12/2017 | Huang | G02B 9/64 |
| 9,952,406 B2* | 4/2018 | Jung | G02B 13/0045 |
| 10,185,127 B2* | 1/2019 | Jung | G02B 13/0045 |
| 10,191,248 B2* | 1/2019 | Hashimoto | G02B 13/0045 |
| 10,191,252 B2* | 1/2019 | Tang | G02B 13/006 |
| 10,247,916 B2* | 4/2019 | Baik | G02B 13/0045 |
| 10,317,645 B2* | 6/2019 | Park | G02B 13/0045 |
| 10,330,892 B2* | 6/2019 | Hashimoto | G02B 13/0045 |
| 10,365,458 B2* | 7/2019 | Jung | G02B 13/0045 |
| 10,558,014 B2* | 2/2020 | Kwak | G02B 9/04 |
| 10,571,661 B2* | 2/2020 | Huang | G02B 3/02 |
| 10,606,035 B2* | 3/2020 | Chen | G02B 9/64 |
| 10,656,380 B2* | 5/2020 | Chen | G02B 27/0037 |
| 10,656,390 B2* | 5/2020 | Hashimoto | G02B 13/0045 |
| 10,670,837 B2* | 6/2020 | Kuo | G02B 13/0045 |
| 10,678,025 B2* | 6/2020 | Chen | G02B 13/0045 |
| 10,678,027 B2* | 6/2020 | Hashimoto | G02B 9/64 |
| 10,698,184 B2* | 6/2020 | Jung | G02B 9/64 |
| 10,725,270 B2* | 7/2020 | Hashimoto | G02B 13/0045 |
| 10,725,271 B2* | 7/2020 | Hashimoto | G02B 13/0045 |
| 10,732,388 B2* | 8/2020 | Hashimoto | G02B 13/0045 |
| 10,809,499 B2* | 10/2020 | Hashimoto | G02B 9/64 |
| 10,838,173 B2* | 11/2020 | Hsueh | G02B 9/64 |
| 10,852,513 B2* | 12/2020 | Kuo | G02B 27/0025 |
| 10,852,515 B2* | 12/2020 | Park | G02B 13/0045 |
| 10,895,718 B2* | 1/2021 | Lin | G02B 13/18 |
| 10,908,392 B2* | 2/2021 | Huang | G02B 9/64 |
| 10,935,759 B2* | 3/2021 | Huh | H04N 5/2253 |
| 10,935,760 B2* | 3/2021 | Huang | G02B 9/64 |
| 10,942,334 B2* | 3/2021 | Xu | G02B 13/0045 |
| 10,942,335 B2* | 3/2021 | Hsueh | G02B 9/64 |
| 10,962,743 B2* | 3/2021 | Hashimoto | G02B 13/0045 |
| 10,983,309 B2* | 4/2021 | Jung | G02B 13/0045 |
| 10,996,441 B2* | 5/2021 | Lyu | G02B 9/64 |
| 11,016,270 B2* | 5/2021 | Tang | G02B 9/64 |
| 11,036,033 B2* | 6/2021 | Huang | G02B 27/0025 |
| 11,048,064 B2* | 6/2021 | Fukaya | G02B 9/64 |
| 11,054,613 B2* | 7/2021 | Fukaya | G02B 13/0045 |
| 11,073,679 B2* | 7/2021 | Fukaya | G02B 13/0045 |
| 11,092,786 B2* | 8/2021 | Jung | G02B 13/0045 |
| 11,112,581 B2* | 9/2021 | Chen | G02B 9/64 |
| 11,112,586 B2* | 9/2021 | Xu | G02B 13/0045 |
| 11,131,834 B2* | 9/2021 | Fukaya | G02B 27/0025 |
| 11,150,444 B2* | 10/2021 | Huh | G02B 9/64 |
| 11,262,541 B2* | 3/2022 | Park | G02B 13/0045 |
| 11,333,861 B2* | 5/2022 | Chen | G02B 9/64 |
| 11,353,686 B2* | 6/2022 | Baik | G02B 7/021 |
| 2011/0134543 A1 | 6/2011 | Jung et al. | |
| 2014/0139719 A1* | 5/2014 | Fukaya | G02B 27/0025 348/340 |
| 2014/0160580 A1* | 6/2014 | Nishihata | G02B 13/18 359/708 |
| 2014/0211324 A1* | 7/2014 | Ishizaka | G02B 27/0025 359/708 |
| 2014/0376105 A1* | 12/2014 | Sekine | G02B 13/006 359/708 |
| 2015/0009578 A1* | 1/2015 | Shinohara | G02B 9/64 359/708 |
| 2015/0070783 A1* | 3/2015 | Hashimoto | G06T 5/002 359/708 |
| 2015/0198787 A1* | 7/2015 | Kubota | G02B 9/64 359/755 |
| 2015/0212298 A1* | 7/2015 | Shinohara | G02B 13/0045 359/708 |
| 2015/0226936 A1* | 8/2015 | Suzuki | G02B 9/12 359/708 |
| 2015/0226941 A1* | 8/2015 | Fukaya | G02B 27/0025 359/708 |
| 2015/0241666 A1* | 8/2015 | Koida | G02B 13/18 359/713 |
| 2015/0247990 A1* | 9/2015 | Kubota | G02B 9/64 359/755 |
| 2015/0247992 A1* | 9/2015 | Ishizaka | G02B 9/64 359/708 |
| 2015/0247993 A1* | 9/2015 | Ishizaka | G02B 13/0045 359/708 |
| 2015/0268448 A1* | 9/2015 | Kubota | G02B 27/0025 359/755 |
| 2015/0316751 A1* | 11/2015 | Sekine | G02B 13/006 359/755 |
| 2015/0378131 A1* | 12/2015 | Tang | G02B 9/64 359/708 |
| 2016/0025953 A1* | 1/2016 | Jung | G02B 13/0045 359/755 |
| 2016/0033742 A1 | 2/2016 | Huang | |
| 2016/0085054 A1* | 3/2016 | Asami | G02B 9/64 359/755 |
| 2016/0109687 A1* | 4/2016 | Son | G02B 9/64 359/755 |
| 2016/0116717 A1* | 4/2016 | Kubota | G02B 13/0045 359/708 |
| 2016/0124191 A1* | 5/2016 | Hashimoto | G02B 9/64 359/708 |
| 2016/0131874 A1* | 5/2016 | Tang | G02B 9/64 359/708 |
| 2016/0139372 A1* | 5/2016 | Tanaka | G02B 13/0045 359/708 |
| 2016/0154214 A1* | 6/2016 | Ishizaka | G02B 27/0025 359/708 |
| 2016/0377839 A1* | 12/2016 | Chen | G02B 13/0045 359/708 |
| 2016/0377841 A1* | 12/2016 | Kubota | G02B 13/0045 359/755 |
| 2017/0045714 A1* | 2/2017 | Huang | G02B 13/0045 |
| 2017/0176723 A1* | 6/2017 | Fukaya | G02B 9/64 |
| 2017/0184822 A1 | 6/2017 | Shi | |
| 2017/0199350 A1 | 7/2017 | Teraoka | |
| 2017/0235109 A1* | 8/2017 | Shin | G02B 9/60 359/708 |
| 2017/0235110 A1 | 8/2017 | Chen | |
| 2017/0329108 A1* | 11/2017 | Hashimoto | G02B 9/64 |
| 2018/0074298 A1* | 3/2018 | Jung | G02B 13/0045 |
| 2018/0074299 A1* | 3/2018 | Huang | G02B 13/0045 |
| 2018/0100993 A1 | 4/2018 | Park | |
| 2018/0106984 A1* | 4/2018 | Tang | G02B 13/006 |
| 2018/0149835 A1* | 5/2018 | Park | G02B 13/0045 |
| 2018/0164544 A1* | 6/2018 | Kwak | G02B 13/0045 |
| 2018/0180854 A1 | 6/2018 | Huh et al. | |
| 2018/0180855 A1* | 6/2018 | Baik | G02B 9/64 |
| 2018/0180856 A1* | 6/2018 | Jung | G02B 13/0045 |
| 2018/0188500 A1* | 7/2018 | Jung | G02B 13/0045 |
| 2018/0239115 A1 | 8/2018 | Hsu et al. | |
| 2018/0246299 A1* | 8/2018 | Fukaya | G02B 27/0025 |
| 2018/0246300 A1* | 8/2018 | Fukaya | G02B 27/0025 |
| 2018/0246301 A1* | 8/2018 | Fukaya | G02B 27/0025 |
| 2018/0267275 A1* | 9/2018 | Fukaya | G02B 13/0045 |
| 2018/0348484 A1* | 12/2018 | Chen | G02B 9/64 |
| 2019/0004285 A1 | 1/2019 | Tang et al. | |
| 2019/0025549 A1* | 1/2019 | Hsueh | G02B 9/64 |
| 2019/0025551 A1* | 1/2019 | Kuo | G02B 13/06 |
| 2019/0056569 A1* | 2/2019 | Yoo | G02B 9/64 |
| 2019/0094494 A1* | 3/2019 | Hsu | G02B 9/64 |
| 2019/0113718 A1* | 4/2019 | Jung | G02B 9/64 |
| 2019/0129147 A1* | 5/2019 | Huh | G02B 13/0045 |
| 2019/0137736 A1* | 5/2019 | Huh | G02B 27/0037 |
| 2019/0146184 A1* | 5/2019 | Xu | H04N 5/2254 359/755 |

(56) References Cited

U.S. PATENT DOCUMENTS

| | | | |
|---|---|---|---|
| 2019/0146185 A1* | 5/2019 | Chen | G02B 13/0045 359/755 |
| 2019/0146189 A1* | 5/2019 | Lyu | G02B 9/64 359/708 |
| 2019/0154998 A1* | 5/2019 | Hashimoto | G02B 13/0045 |
| 2019/0154999 A1* | 5/2019 | Hashimoto | G02B 9/64 |
| 2019/0155000 A1* | 5/2019 | Hashimoto | G02B 9/64 |
| 2019/0170980 A1* | 6/2019 | Hashimoto | G02B 9/64 |
| 2019/0179125 A1* | 6/2019 | Baik | G02B 1/041 |
| 2019/0196144 A1* | 6/2019 | Chen | G02B 27/0025 |
| 2019/0196151 A1* | 6/2019 | Chen | G02B 13/0045 |
| 2019/0227279 A1* | 7/2019 | Yang | G02B 13/0045 |
| 2019/0243106 A1* | 8/2019 | Xu | G02B 5/005 |
| 2019/0250381 A1* | 8/2019 | Park | G02B 13/0045 |
| 2019/0278062 A1* | 9/2019 | Chen | G02B 9/64 |
| 2019/0302424 A1* | 10/2019 | Kuo | G02B 13/18 |
| 2019/0302427 A1* | 10/2019 | Jung | G02B 13/0045 |
| 2019/0310444 A1* | 10/2019 | Hashimoto | G02B 13/0045 |
| 2019/0331899 A1* | 10/2019 | Huang | G02B 27/0025 |
| 2019/0346663 A1* | 11/2019 | Tang | G02B 9/64 |
| 2019/0361199 A1* | 11/2019 | Hsu | G02B 13/0045 |
| 2019/0369362 A1* | 12/2019 | Son | G02B 9/64 |
| 2019/0369366 A1* | 12/2019 | Baik | G02B 7/022 |
| 2019/0391365 A1* | 12/2019 | Son | G02B 9/64 |
| 2020/0003995 A1* | 1/2020 | Jung | G02B 9/64 |
| 2020/0012080 A1* | 1/2020 | Yoo | G02B 9/64 |
| 2020/0073085 A1* | 3/2020 | Huang | G02B 9/64 |
| 2020/0150401 A1* | 5/2020 | Huang | G02B 13/0045 |
| 2020/0174228 A1* | 6/2020 | Chen | G02B 9/64 |
| 2020/0209542 A1* | 7/2020 | Hsueh | G02B 15/167 |
| 2020/0233186 A1* | 7/2020 | Lyu | G02B 13/0045 |
| 2020/0257089 A1* | 8/2020 | Chen | G02B 13/0045 |
| 2020/0285030 A1* | 9/2020 | Tang | G02B 13/0045 |
| 2020/0292784 A1* | 9/2020 | Range | G02B 7/04 |
| 2021/0018731 A1* | 1/2021 | Hsueh | G02B 9/64 |
| 2021/0026114 A1* | 1/2021 | Baik | G02B 1/041 |
| 2021/0041674 A1* | 2/2021 | Kuo | G02B 27/0025 |
| 2021/0048610 A1* | 2/2021 | Huh | G02B 27/0025 |
| 2021/0048648 A1* | 2/2021 | Baik | G02B 7/021 |
| 2021/0063690 A1* | 3/2021 | Huh | G02B 13/0045 |
| 2021/0096333 A1* | 4/2021 | Lin | G02B 13/0045 |
| 2021/0109328 A1* | 4/2021 | Huang | G02B 9/64 |
| 2021/0116684 A1* | 4/2021 | Jung | G02B 13/0045 |
| 2021/0149155 A1* | 5/2021 | Huang | H04N 5/2254 |
| 2021/0199929 A1* | 7/2021 | Jung | G02B 13/0045 |
| 2021/0239941 A1* | 8/2021 | Tang | G02B 9/64 |
| 2021/0263288 A1* | 8/2021 | Huang | G02B 13/0045 |
| 2021/0341711 A1* | 11/2021 | Jung | G02B 13/0045 |
| 2021/0364739 A1* | 11/2021 | Chen | G02B 27/0037 |
| 2021/0389558 A1* | 12/2021 | Son | G02B 9/64 |
| 2022/0003974 A1* | 1/2022 | Huh | G02B 13/0045 |
| 2022/0057608 A1* | 2/2022 | Chen | G02B 9/64 |
| 2022/0057609 A1* | 2/2022 | Hsueh | G02B 13/0045 |
| 2022/0137371 A1* | 5/2022 | Chen | G02B 9/64 359/708 |
| 2022/0137375 A1* | 5/2022 | Park | G02B 9/64 359/708 |
| 2022/0214521 A1* | 7/2022 | Yang | G02B 13/0045 |
| 2022/0244492 A1* | 8/2022 | Hosono | G02B 9/62 |
| 2022/0244505 A1* | 8/2022 | Chen | G02B 9/64 |
| 2022/0252832 A1* | 8/2022 | Son | G02B 7/021 |
| 2022/0252845 A1* | 8/2022 | Yoo | G02B 9/64 |
| 2022/0283406 A1* | 9/2022 | Lee | G02B 7/04 |

FOREIGN PATENT DOCUMENTS

| | | | | |
|---|---|---|---|---|
| CN | 104597582 A | | 5/2015 | |
| CN | 107817576 A | | 3/2018 | |
| CN | 108241199 A | | 7/2018 | |
| CN | 108241200 A | | 7/2018 | |
| CN | 108254856 A | | 7/2018 | |
| CN | 108459392 A | | 8/2018 | |
| CN | 208172354 U | | 11/2018 | |
| CN | 109212717 A | | 1/2019 | |
| CN | 109283657 A | | 1/2019 | |
| CN | 109358416 A | * | 2/2019 | ......... G02B 13/0045 |
| CN | 109358416 A | | 2/2019 | |
| JP | 2017-122843 A | | 7/2017 | |
| KR | 10-2018-0075151 A | | 7/2018 | |

OTHER PUBLICATIONS

Chinese Office Action dated Dec. 3, 2021, in counterpart Chinese Patent Application No. 202011432053.2 (7 pages in English, 9 pages in Chinese).

Chinese Office Action dated Dec. 2, 2021, in counterpart Chinese Patent Application No. 202011435592.1 (9 pages in English, 12 pages in Chinese).

Korean Office Action dated Apr. 13, 2022, in the counterpart Korean Patent Application No. 10-2022-0017864. (12 pages in English and 6 pages in Korean).

Chinese Office Action dated Dec. 17, 2021, in counterpart Chinese Patent Application No. 202011032644.0 (6 pages in English, 8 pages in Korean).

Korean Office Action dated Nov. 25, 2020 in counterpart Korean Patent Application No. 10-2019-0091493 (11 pages in English and 7 pages in Korean).

Korean Office Action dated Dec. 11, 2020 in counterpart Korean Patent Application No. 10-2020-0166991 (11 pages in English and 7 pages in Korean).

Chinese Office Action dated Nov. 23, 2022, in counterpart Chinese Patent Application No. 202010123605.5 (12 Pages in Chinese, 13 Pages in English).

* cited by examiner

OPTICAL IMAGING SYSTEM

CROSS-REFERENCE TO RELATED APPLICATIONS

This application claims the benefit under 35 USC 119(a) of Korean Patent Application Nos. 10-2019-0020453 filed on Feb. 21, 2019, and 10-2019-0091493 filed on Jul. 29, 2019, in the Korean Intellectual Property Office, the entire disclosures of which are incorporated herein by reference for all purposes.

BACKGROUND

1. Field

This application relates to an optical imaging system.

2. Description of Related Art

Recently, a portable terminal device has been designed to include a camera to allow a video call to be made and an image to be captured. Also, as a function of a camera in a portable terminal device is frequently used, there has been an increased demand for a high resolution and a high performance in a camera of a portable terminal device.

However, as a size and a weight of a portable terminal has been reduced, there have bee difficulties in implementing a camera having a high resolution and a high performance.

To address the above-described issue, a lens of a camera has been manufactured using a plastic material lighter than glass, and an optical imaging system has been designed to include five or six lenses to implement a high resolution.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, a sixth lens, and a seventh lens sequentially disposed in ascending numerical order along an optical axis of the optical imaging system from an object side of the optical imaging system toward an imaging surface of an image sensor, wherein a conditional expression $f/f2+f/f3<-0.4$ may be satisfied, where f is a focal length of the optical imaging system, f2 is a focal length of the second lens, and f3 is a focal length of the third lens, and a conditional expression $TTL/(2*IMG\ HT)<0.69$ may be satisfied, where TTL is a distance along the optical axis from an object-side surface of the first lens to the imaging surface of the image sensor, and IMG HT is one-half of a diagonal length of the imaging surface of the image sensor.

A conditional expression $n2+n3>3.15$ may be satisfied, where n2 is a refractive index of the second lens, and n3 a refractive index of the third lens.

A conditional expression $n2+n3+n4>4.85$ may be satisfied, where n4 is a refractive index of the fourth lens.

A conditional expression $v1-v2>30$ may be satisfied, where v1 is an Abbe number of the first lens, and v2 is an Abbe number of the second lens.

A conditional expression $1.0<TTL/f<1.10$ may be satisfied.

A conditional expression $0.15<BFL/f<0.25$ may be satisfied, where BFL is a distance along the optical axis from an image-side surface of the seventh lens to the imaging surface of the image sensor.

A conditional expression $0.005<D1/f<0.04$ may be satisfied, where D1 is a distance along the optical axis between an image-side surface of the first lens and an object-side surface of the second lens.

A conditional expression $0.30<R1/f<0.40$ may be satisfied, where R1 is a radius of curvature of an object-side surface of the first lens.

A conditional expression $1.4<|f23|/f1<2.8$ may be satisfied, where f1 is a focal length of the first lens, and f23 is a composite focal length of the second lens and the third lens.

A conditional expression $Fno<2.3$ may be satisfied, where Fno is an F-number of the optical imaging system.

A refractive index of each of at least two lenses of the first to seventh lenses may be 1.67 or higher.

The first lens may have a positive refractive power, either one or both of the second lens and the third lens may have a negative refractive power, and a refractive index of each of the either one or both of the second lens and the third lens may be 1.67 or higher.

The first lens may have a positive refractive power, and the seventh lens may have a negative refractive power.

In another general aspect an optical imaging system includes a first lens, a second lens, a third lens, a fourth lens, a fifth lens, a sixth lens, and a seventh lens sequentially disposed in ascending numerical order along an optical axis of the optical imaging system from an object side of the optical imaging system toward an imaging surface of an image sensor, wherein the first lens has a positive refractive power, and either one or both of the second lens and the third lens has a negative refractive power, a conditional expression $n2+n3>3.15$ is satisfied, where n2 is a refractive index of the second lens, and n3 is a refractive index of the third lens, and a conditional expression $TTL/(2*IMG\ HT)<0.69$ is satisfied, where TTL is a distance along the optical axis from an object-side surface of the first lens to the imaging surface of the image sensor, and IMG HT is one-half of a diagonal length of the imaging surface of the image sensor.

A conditional expression $f/f2+f/f3<-0.4$ may be satisfied, where f is a focal length of the optical imaging system, f2 is a focal length of the second lens, and f3 is a focal length of the third lens.

A conditional expression $v1-v2>30$ and $n2+n3+n4>4.85$ may be satisfied, where v1 is an Abbe number of the first lens, v2 is an Abbe number of the second lens, and n4 is a refractive index of the fourth lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
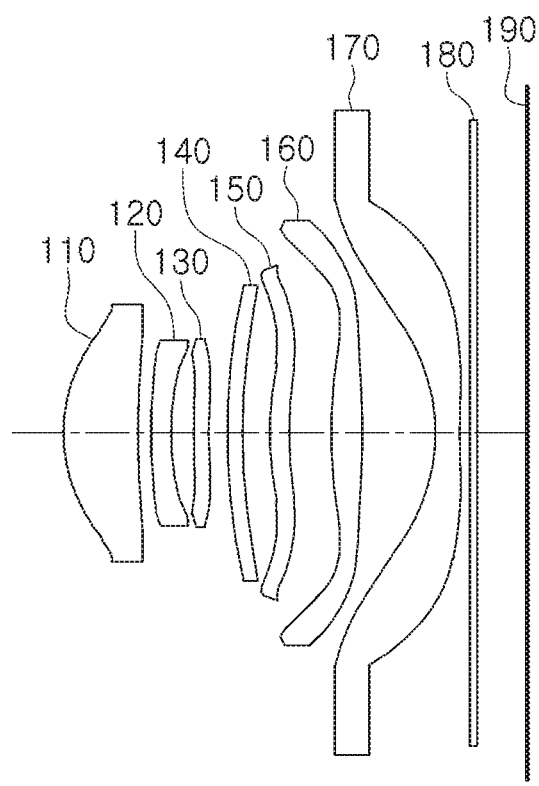
FIG. 1 is a diagram illustrating a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

In the drawings, a thickness, a size, and a shape of each lens of an optical imaging system may be exaggerated for ease of illustration, and a spherical or aspherical shape illustrated in the drawings is merely an example, and the shape is not limited thereto.

A first lens of the optical imaging system is a lens that is closest to an object side of the optical imaging system, and a seventh lens of the optical imaging system is a lens that is closest to an image sensor of the optical imaging system.

A first surface (or an object-side surface) of a lens is a surface that faces toward the object side of the optical imaging system, and a second surface (or an image-side surface) of a lens is a surface that faces toward the image sensor.

Numerical values of radiuses of curvature of surfaces of elements, thicknesses of elements, distances between elements, distances between a surface of one element and a surface of another element, focal lengths, and image heights (IMG HT) are expressed in millimeters (mm), and fields of view (FOV) are expressed in degrees. The thicknesses and the distances are measured along the optical axis of the optical imaging system.

A statement that a surface of lens is convex means that at least a paraxial region of the surface is convex, a statement that a surface of a lens is concave means that at least a paraxial region of the surface is concave, and a statement that a surface of a lens is planar means that at least a paraxial region of the surface is planar. Thus, even when a surface of a lens is described as being convex, an edge region of the surface may be concave. Also, even when a surface of a lens is described as being concave, an edge region of the surface may be convex. Also, even when a surface of a lens is described as being planar, an edge region of the surface may be convex or concave.

A paraxial region of a lens surface is a central portion of the lens surface surrounding the optical axis of the lens surface in which light rays incident to the lens surface make a small angle $\theta$ to the optical axis and the approximations $\sin \theta \approx \theta$, $\tan \theta \approx \theta$, and $\cos \delta \approx 1$ are valid.

The optical imaging system may include seven lenses.

For example, the optical imaging system may include a first lens, a second lens, a third lens, a fourth lens, a fifth lens, a sixth lens, and a seventh lens disposed in ascending numerical order along an optical axis of the optical imaging system from an object side of the optical imaging system toward an image side of the optical imaging system. The first to seventh lenses may be disposed with predetermined distances therebetween along the optical axis.

However, the optical imaging system may include other elements in addition to the seven lenses.

For example, the optical imaging system may further include an image sensor for converting an incident image of an object into an electrical signal.

Also, the optical imaging system may further include an infrared filter (hereinafter referred to as a "filter") for blocking infrared rays. The filter may be disposed between the seventh lens and the image sensor.

Also, an optical imaging system may further include a stop for adjusting an amount of light incident onto the image sensor. The stop may disposed at any desired position.

The first to seventh lenses included in the optical imaging system may be made of a plastic material.

Any one or any combination of any two or more of the first to seventh lenses may have an aspherical surface. Alternatively, each of the first to seventh lenses may have at least one aspherical surface.

Either one or both of a first surface and a second surface of each of the first to seventh lenses may be an aspherical surface defined by Equation 1 below.

$$Z = \frac{cY^2}{1 + \sqrt{1-(1+K)c^2Y^2}} + AY^4 + BY^6 + CY^8 + DY^{10} + EY^{12} + FY^{14} + GY^{16} + HY^{18} + JY^{20} \tag{1}$$

In Equation 1, "c" is a curvature of the aspherical surface at an optical axis of the aspherical surface and is equal to an inverse of a radius of curvature of the aspherical surface at the optical axis, "K" is a conic constant, "Y" is a distance from a random point on the aspherical surface to the optical axis in a direction perpendicular to the optical axis, "A" to "H" and "J" are aspherical coefficients of the aspherical surface, and "Z" is a distance from the random point on the aspherical surface to a plane perpendicular to the optical axis and containing an apex of the aspherical surface in a direction parallel to the optical axis.

In one example, the first to seventh lenses respectively may have a positive refractive power, a negative refractive power, a positive refractive power, a positive refractive power, a positive refractive power, a positive refractive power, and a negative refractive power.

In another example, the first to seventh lenses respectively may have a positive refractive power, a positive refractive power, a negative refractive power, a positive refractive power, a positive refractive power, a positive refractive power, and a negative refractive power.

In another example, the first to seventh lenses respectively may have a positive refractive power, a negative refractive power, a negative refractive power, a positive refractive power, a positive refractive power, a positive refractive power, and a negative refractive power.

In another example, the first to seventh lenses respectively may have a positive refractive power, a negative refractive power, a negative refractive power, a positive refractive power, a positive refractive power, a negative refractive power, and a negative refractive power.

In another example, the first to seventh lenses respectively may have a positive refractive power, a negative refractive power, a positive refractive power, a negative refractive power, a negative refractive power, a positive refractive power, and a negative refractive power.

Examples of the optical imaging system may satisfy any one or any combination of any two or more of Conditional Expressions 1 to 11 below.

$f/f2+f/f3<-0.4$ (Conditional Expression 1)

$v1-v2>30$ (Conditional Expression 2)

$1.0<TTL/f<1.10$ (Conditional Expression 3)

$n2+n3>3.15$ (Conditional Expression 4)

$0.15<BFL/f<0.25$ (Conditional Expression 5)

$0.005<D1/f<0.04$ (Conditional Expression 6)

$0.30<R1/f<0.40$ (Conditional Expression 7)

$TTL/(2*IMG\ HT)<0.69$ (Conditional Expression 8)

$Fno<2.3$ (Conditional Expression 9)

$n2+n3+n4>4.85$ (Conditional Expression 10)

$1.4<|f23|/f1<2.8$ (Conditional Expression 11)

In Conditional Expressions 1 to 11, "f" is a focal length of the optical imaging system, "f1" is a focal length of the first lens, "f2" is a focal length of the second lens, "f3" is a focal length of the third lens, "f23" is a composite focal length of the second lens and the third lens, "v1" is an Abbe number of the first lens, "v2" is an Abbe number of the second lens, "TTL" is a distance along an optical axis of the optical imaging system from an object-side surface of the first lens to an imaging surface of an image sensor, "n2" is a refractive index of the second lens, "n3" is a refractive index of the third lens, "n4" is a refractive index of the fourth lens, "BFL" is a distance along the optical axis from an image-side surface of the seventh lens to the imaging surface of the image sensor, "D1" is a distance along the optical axis between an image-side surface of the first lens and an object-side surface of the second lens, "R1" is a radius of curvature of an object-side surface of the first lens, "IMG HT" is one-half of a diagonal length of the imaging surface of the image sensor, and "Fno" is an F-number of the optical imaging system.

In the description below, the first to seventh lenses in examples of the optical imaging system will be described.

The first lens may have a positive refractive power. The first lens may have a meniscus shape that is convex towards an object side of the optical imaging system. In other words, a first surface of the first lens may be convex, and a second surface of the first lens may be concave.

Either one or both of the first surface and the second surface of the first lens may be aspherical. For example, both surfaces of the first lens may be aspherical.

The second lens may have a positive refractive power or a negative refractive power. The second lens may have a meniscus shape that is convex towards the object side of the optical imaging system. In other words, a first surface of the second lens may be convex, and a second surface of the second lens may be concave.

Either one or both of the first surface and the second surface of the second lens may be aspherical. For example, both surfaces of the second lens may be aspherical.

The third lens may have a positive refractive power or a negative refractive power. The third lens may have a meniscus shape that is convex towards the object side of the optical imaging system. In other words, a first surface of the third lens may be convex, and a second surface of the third lens may be concave.

Either one or both of the first surface and the second surface of the third lens may be aspherical. For example, both surfaces of the third lens may be aspherical.

At least one inflection point may be formed on either one or both of the first surface and the second surface of the third lens. For example, the first surface of the third lens may be convex in a paraxial region of the first surface, and may be concave in an edge region of the first surface.

The fourth lens may have a positive refractive power or a negative refractive power. The fourth lens may have a meniscus shape that is convex towards the object side of the optical imaging system. In other words, a first surface of the fourth lens may be convex, and a second surface of the fourth lens may be concave.

Alternatively, the first surface of the fourth lens may be planar in a paraxial region of the first surface, and the second surface may be convex.

Alternatively, both surfaces of the fourth lens may be convex. In other words, the first surface and the second surface of the fourth lens may be convex.

Either one or both of the first surface and the second surface of the fourth lens may be aspherical. For example, both surfaces of the fourth lens may be aspherical.

At least one inflection point may be formed on either one or both of the first surface and the second surface of the fourth lens. For example, the second surface of the fourth lens may be concave in a paraxial region of the second surface, and may be convex in an edge region of the second surface.

The fifth lens may have a positive refractive power or a negative refractive power. The fifth lens may have a meniscus shape that is convex towards the object side of the optical imaging system. In other words, a first surface of the fifth lens may be convex in a paraxial region of the first surface, and a second surface of the fifth lens may be concave.

Alternatively, both surfaces of the fifth lens may be convex. In other words, the first surface and the second surface of the fifth lens may be convex.

Alternatively, both surfaces of the fifth lens may be concave. In other words, the first surface and the second surface of the fifth lens may be concave.

Either one or both of the first surface and the second surface of the fifth lens may be aspherical. For example, both surfaces of the fifth lens may be aspherical.

At least one inflection point may be formed on either one or both of the first surface and the second surface of the fifth lens. For example, the first surface of the fifth lens may be convex in a paraxial region of the first surface, and may be concave in an edge region of the first surface. The second surface of the fifth lens may be concave in a paraxial region of the second surface, and may be convex in an edge region of the second surface.

The sixth lens may have a positive refractive power or a negative refractive power. Both surfaces of the sixth lens may be convex. In other words, a first surface and a second surface of the sixth lens may be convex in a paraxial region of the second surface.

The sixth lens may have a meniscus shape that is convex towards an image side of the optical imaging system. In other words, the first surface of the sixth lens may be concave in a paraxial region of the first surface, and the second surface of the sixth lens may be convex in a paraxial region of the second surface.

Alternatively, the sixth lens may have a meniscus shape that is convex towards the object side of the optical imaging system. In other words, the first surface of the sixth lens may be convex in a paraxial region of the first surface, and the second surface of the sixth lens may be concave in a paraxial region of the first surface.

Either one or both of the first surface and the second surface of the sixth lens may be aspherical. For example, both surfaces of the sixth lens may be aspherical.

At least one inflection point may be formed on either one or both of the first surface and the second surface of the sixth lens. For example, the first surface of the sixth lens may be convex in a paraxial region of the first surface, and may be concave in an edge region of the first surface. The second surface of the sixth lens may be convex in a paraxial region of the second surface, and may be concave in an edge region of the second surface.

The seventh lens may have a negative refractive power. Both surfaces of the seventh lens may be concave. In other words, a first surface of the seventh lens may be concave in a paraxial region of the first surface, and a second surface of the seventh lens may be concave in a paraxial region of the second surface.

Alternatively, the seventh lens may have a meniscus shape that is convex towards the object side of the optical imaging system. In other words, the first surface of the seventh lens may be convex in the paraxial region of the first surface, and the second surface of the seventh lens may be concave in the paraxial region of the second surface.

Either one or both of the first surface and the second surface of the seventh lens may be aspherical. For example, both surfaces of the seventh lens may be aspherical.

At least one inflection point may be formed on either one or both of the first surface and the second surface of the seventh lens. For example, the first surface of the seventh lens may be concave in the paraxial region of the first surface, and may be convex in an edge region of the first surface. The second surface of the seventh lens may be concave in the paraxial region of the second surface, and may be convex in an edge region of the second surface.

The first lens may be made of a first plastic material, and the second lens may be made of a second plastic material having optical properties that are different from optical properties of the first plastic material.

A refractive index of at least one of the first to seventh lenses may be 1.67 or higher.

Also, a refractive index of each of at least two lenses of the first to seventh lenses may be 1.67 or higher. For example, in one example, a refractive index of each of three lenses of the first to seventh lenses may be 1.67 or higher, and in another example, a refractive index of each of two lenses of the first to seventh lenses may be 1.67 or higher.

A refractive index of a lens having a negative refractive power among the first to third lenses may be 1.67 or higher. As an example, either one or both of the second lens and the third lens may have a negative refractive power, and may have a refractive index of 1.67 or higher.

Examples of an optical imaging system having first to seventh lenses configured as described above have improved aberration properties.

Figure 2:
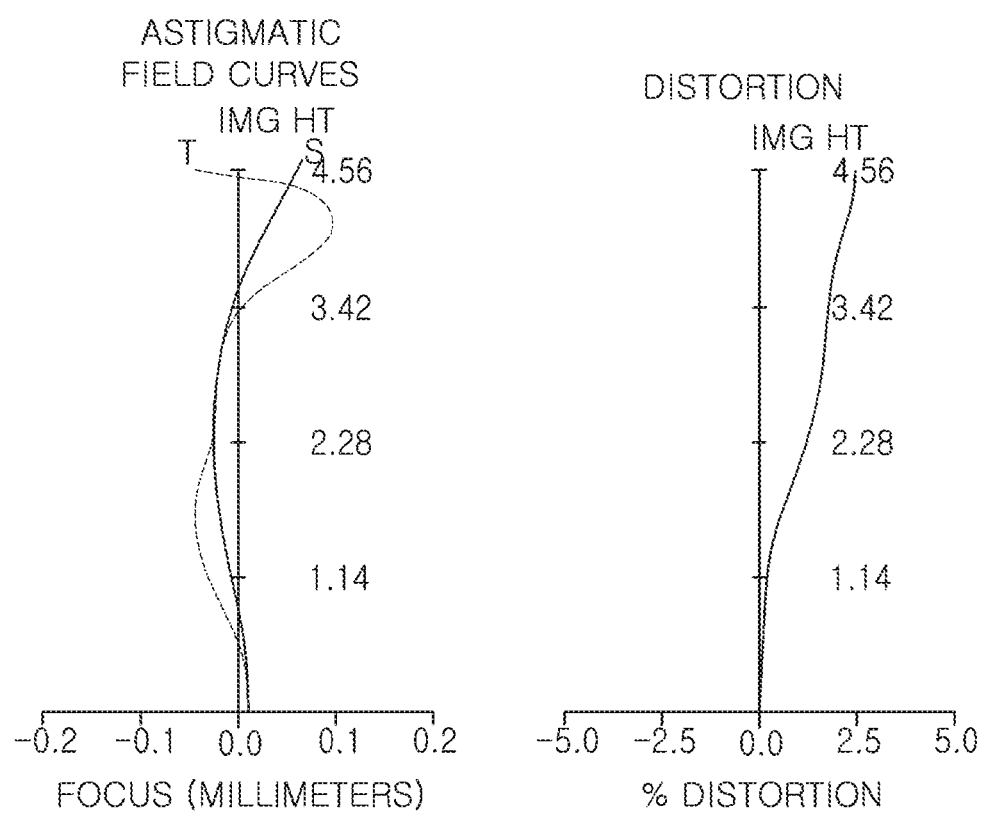
FIG. 2 is a diagram illustrating aberration properties of the optical imaging system illustrated in FIG. 1.

FIG. 1 is a diagram illustrating a first example of an optical imaging system, and FIG. 2 is a diagram illustrating aberration properties of the optical imaging system illustrated in FIG. 1.

The optical imaging system of the first example may include a first lens 110, a second lens 120, a third lens 130, a fourth lens 140, a fifth lens 150, a sixth lens 160, and a seventh lens 170, and may further include a stop (not shown), a filter 180, and an image sensor 190.

Characteristics of elements illustrated in FIG. 1, including radiuses of curvature of surfaces of elements, thicknesses of elements, distances between elements, refractive indexes of elements, Abbe numbers of elements, and focal lengths of elements, are listed in Table 1 below.

TABLE 1

| Surface No. | Element | Radius of Curvature | Thickness or Distance | Refractive Index | Abbe Number | Focal Length |
|---|---|---|---|---|---|---|
| S1 | First | 2.136 | 0.994 | 1.549 | 63.6 | 5.320 |
| S2 | Lens | 6.556 | 0.182 | | | |
| S3 | Second | 6.634 | 0.277 | 1.680 | 19.2 | −12.9434 |
| S4 | Lens | 3.718 | 0.299 | | | |
| S5 | Third | 8.306 | 0.203 | 1.680 | 19.2 | 662.426 |
| S6 | Lens | 8.379 | 0.234 | | | |
| S7 | Fourth | 5.127 | 0.216 | 1.546 | 56.1 | 355.9385 |
| S8 | Lens | 5.187 | 0.362 | | | |
| S9 | Fifth | 2.777 | 0.248 | 1.680 | 19.2 | 148.2741 |
| S10 | Lens | 2.753 | 0.564 | | | |
| S11 | Sixth | 5.361 | 0.404 | 1.546 | 56.1 | 5.881274 |
| S12 | Lens | −7.813 | 0.967 | | | |
| S13 | Seventh | −2.867 | 0.342 | 1.568 | 63.4 | −3.76588 |
| S14 | Lens | 8.893 | 0.125 | | | |

TABLE 1-continued

| Surface No. | Element | Radius of Curvature | Thickness or Distance | Refractive Index | Abbe Number | Focal Length |
|---|---|---|---|---|---|---|
| S15 | Filter | Infinity | 0.110 | 1.518 | 64.2 | |
| S16 | | Infinity | 0.684 | | | |
| S17 | Imaging Surface | Infinity | −0.010 | | | |

In the first example, a focal length f of the optical imaging system is 5.744 mm, Fno is 2.01, FOV is 77.23°, BFL is 0.909 mm, TTL is 6.201 mm, and IMG HT is 4.56 mm.

Fno is a number indicating a brightness of the optical imaging system, and is equal to the effective focal length of the optical imaging system divided by the entrance pupil diameter of the optical imaging system, FOV is a field of view of the optical imaging system, BFL is a distance along an optical axis of the optical imaging system from an image-side surface of the seventh lens to an imaging surface of the image sensor, TTL is a distance along the optical axis from an object-side surface of the first lens to the imaging surface of the image sensor, and IMG HT is one-half of a diagonal length of the imaging surface of the image sensor.

In the first example, the first lens 110 may have a positive refractive power, a first surface of the first lens 110 may be convex, and a second surface of the first lens 110 may be concave.

The second lens 120 may have a negative refractive power, a first surface of the second lens 120 may be convex, and a second surface of the second lens 120 may be concave.

The third lens 130 may have a positive refractive power, a first surface of the third lens 130 may be convex in a paraxial region of the first surface, and a second surface of the third lens 130 may be concave in a paraxial region of the second surface.

At least one inflection point may be formed on either one or both of the first surface and the second surface of the third lens 130. For example, the first surface of the third lens 130 may be convex in a paraxial region of the first surface, and may be concave in an edge region of the first surface. The second surface of the third lens 130 may be concave in a paraxial region of the second surface, and may be convex in an edge region of the second surface.

The fourth lens 140 may have a positive refractive power, a first surface of the fourth lens 140 may be convex, and a second surface of the fourth lens 140 may be concave.

The fifth lens 150 may have a positive refractive power, a first surface of the fifth lens 150 may be convex in a paraxial region of the first surface, and a second surface of the fifth lens 150 may be concave in a paraxial region of the second surface.

At least one inflection point may be formed on either one or both of the first surface and the second surface of the fifth lens 150. For example, the first surface of the fifth lens 150 may be convex in a paraxial region of the first surface, and may be concave in an edge region of the first surface. The second surface of the fifth lens 150 may be concave in a paraxial region of the second surface, and may be convex in an edge region of the second surface.

The sixth lens 160 may have a positive refractive power, and the first surface and the second surface of the sixth lens 160 may be convex.

At least one inflection point may be formed on either one or both of the first surface and the second surface of the sixth lens 160. For example, the first surface of the sixth lens 160 may be convex in a paraxial region of the first surface, and may be concave in an edge region of the first surface. The second surface of the sixth lens 160 may be convex in a paraxial region of the second surface, and may be concave in an edge region of the second surface.

The seventh lens 170 may have a negative refractive power, a first surface of the seventh lens 170 may be concave in a paraxial region of the first surface, and a second surface of the seventh lens 170 may be concave in a paraxial region of the second surface.

At least one inflection point may be formed on either one or both of the first surface and the second surface of the seventh lens 170. For example, the first surface of the seventh lens 170 may be concave in a paraxial region of the first surface, and may be convex in an edge region of the first surface. The second surface of the seventh lens 170 may be concave in a paraxial region of the second surface, and may be convex in an edge region of the second surface.

The surfaces of the first lens 110 to the seventh lens 170 may have the aspheric coefficients listed in Table 2 below. For example, each of an object-side surface and an image-side surface of each of the first lens 110 to the seventh lens 170 may be aspherical.

TABLE 2

| | S1 | S2 | S3 | S4 | S5 | S6 | S7 |
|---|---|---|---|---|---|---|---|
| K | −1.391 | −41.532 | 22.994 | 5.557 | −96.881 | −27.470 | −45.144 |
| A | 0.021 | −0.033 | −0.115 | −0.081 | −0.020 | −0.015 | 0.056 |
| B | −0.031 | −0.006 | 0.200 | 0.108 | −0.234 | −0.193 | −0.161 |
| C | 0.080 | 0.134 | −0.380 | −0.066 | 0.906 | 0.472 | 0.189 |
| D | −0.120 | −0.363 | 0.740 | 0.059 | −2.271 | −0.702 | −0.120 |
| E | 0.111 | 0.543 | −1.022 | −0.038 | 3.836 | 0.712 | 0.042 |
| F | −0.064 | −0.492 | 0.902 | −0.062 | −4.262 | −0.514 | −0.007 |
| G | 0.022 | 0.266 | −0.486 | 0.139 | 2.936 | 0.251 | 0.000 |
| H | −0.004 | −0.079 | 0.146 | −0.094 | −1.131 | −0.072 | 0.000 |
| J | 0.000 | 0.010 | −0.019 | 0.023 | 0.186 | 0.009 | 0.000 |

| | S8 | S9 | S10 | S11 | S12 | S13 | S14 |
|---|---|---|---|---|---|---|---|
| K | −68.094 | −24.568 | −23.418 | −37.555 | 3.848 | −4.196 | −0.624 |
| A | 0.033 | −0.022 | −0.042 | 0.027 | 0.049 | −0.066 | −0.075 |

TABLE 2-continued

| | | | | | | | |
|---|---|---|---|---|---|---|---|
| B | −0.080 | −0.034 | −0.022 | −0.038 | −0.028 | 0.036 | 0.036 |
| C | 0.058 | 0.070 | 0.057 | 0.022 | 0.011 | −0.012 | −0.013 |
| D | −0.009 | −0.068 | −0.051 | −0.008 | −0.002 | 0.003 | 0.003 |
| E | −0.010 | 0.038 | 0.025 | 0.002 | 0.000 | 0.000 | −0.001 |
| F | 0.007 | −0.013 | −0.008 | 0.000 | 0.000 | 0.000 | 0.000 |
| G | −0.002 | 0.003 | 0.001 | 0.000 | 0.000 | 0.000 | 0.000 |
| H | 0.000 | 0.000 | 0.000 | 0.000 | 0.000 | 0.000 | 0.000 |
| J | 0.000 | 0.000 | 0.000 | 0.000 | 0.000 | 0.000 | 0.000 |

The first example of the optical imaging system illustrated in FIG. 1 configured according to Tables 1 and 2 above may have the aberration properties illustrated in FIG. 2.

Figure 3:
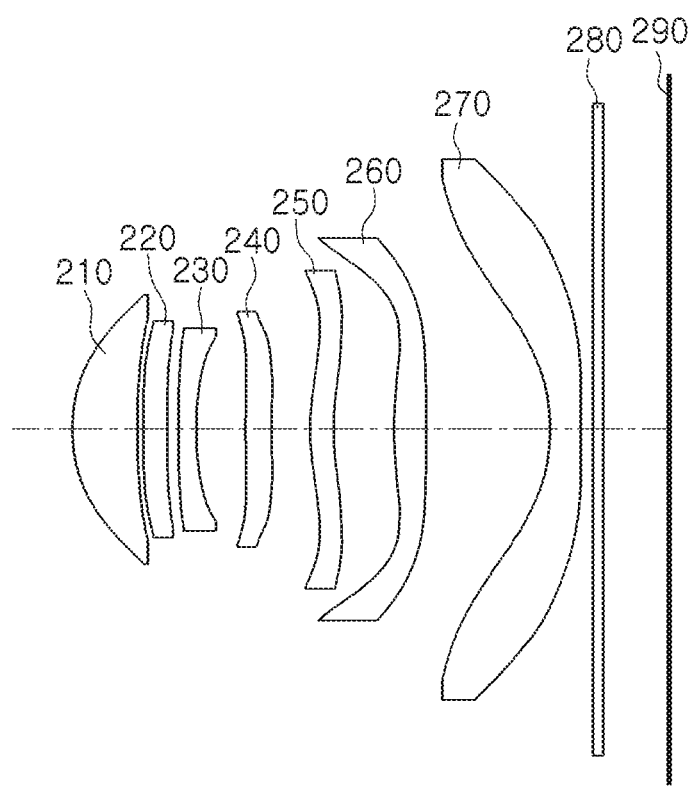
FIG. 3 is a diagram illustrating a second example of an optical imaging system.
Figure 4:
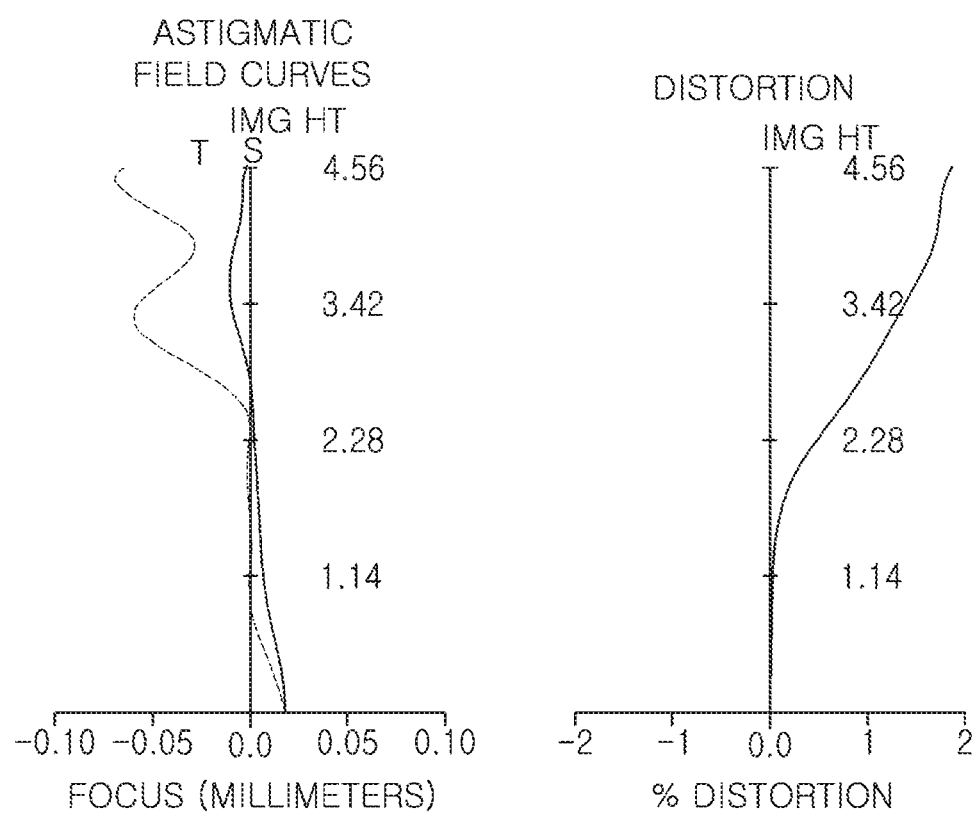
FIG. 4 is a diagram illustrating aberration properties of the optical imaging system illustrated in FIG. 3.

FIG. 3 is a diagram illustrating a second example of an optical imaging system, and FIG. 4 is a diagram illustrating aberration properties of the optical imaging system illustrated in FIG. 3.

The optical imaging system of the second example may include a first lens 210, a second lens 220, a third lens 230, a fourth lens 240, a fifth lens 250, a sixth lens 260, and a seventh lens 270 and may further include a stop (not shown), a filter 280, and an image sensor 290.

Characteristics of elements illustrated in FIG. 3, including radiuses of curvature of surfaces of elements, thicknesses of elements, distances between elements, refractive indexes of elements, Abbe numbers of elements, and focal lengths of elements, are listed in Table 3 below.

TABLE 3

| Surface No. | Element | Radius of Curvature | Thickness or Distance | Refractive Index | Abbe Number | Focal Length |
|---|---|---|---|---|---|---|
| S1 | First | 1.962 | 0.671 | 1.546 | 56.1 | 5.441 |
| S2 | Lens | 5.069 | 0.061 | | | |
| S3 | Second | 6.492 | 0.248 | 1.621 | 25.8 | 20.74802 |
| S4 | Lens | 12.891 | 0.121 | | | |
| S5 | Third | 11.498 | 0.192 | 1.689 | 18.4 | −7.739 |
| S6 | Lens | 3.618 | 0.515 | | | |
| S7 | Fourth | 11.863 | 0.272 | 1.680 | 19.2 | 92.57202 |
| S8 | Lens | 14.484 | 0.400 | | | |
| S9 | Fifth | 2.887 | 0.240 | 1.680 | 19.2 | 70.44759 |
| S10 | Lens | 2.969 | 0.636 | | | |
| S11 | Sixth | 6.393 | 0.321 | 1.546 | 56.1 | 8.557163 |
| S12 | Lens | −17.109 | 1.297 | | | |
| S13 | Seventh | −2.593 | 0.320 | 1.546 | 56.1 | −4.43142 |
| S14 | Lens | 38.197 | 0.125 | | | |
| S15 | Filter | Infinity | 0.110 | 1.518 | 64.2 | |
| S16 | | Infinity | 0.690 | | | |
| S17 | Imaging Plane | Infinity | −0.018 | | | |

In the second example, a focal length f of the optical imaging system is 6.000 mm, Fno is 2.18, FOV is 72.96°, BFL is 0.908 mm, TTL is 6.202 mm, and IMG HT is 4.56 mm.

The definitions of Fno, FOV, BFL, TTL, and IMG HT are the same as in the first example.

In the second example, the first lens 210 may have a positive refractive power, a first surface of the first lens 210 may be convex, and a second surface of the first lens 210 may be concave.

The second lens 220 may have a positive refractive power, a first surface of the second lens 220 may be convex, and a second surface of the second lens 220 may be concave.

The third lens 230 may have a negative refractive power, a first surface of the third lens 230 may be convex, and a second surface of the third lens 230 may be concave.

The fourth lens 240 may have a positive refractive power, a first surface of the fourth lens 240 may be convex in a paraxial region of the first surface, and a second surface of the fourth lens 240 may be concave in a paraxial region of the second surface.

At least one inflection point may be formed on either one or both of the first surface and the second surface of the fourth lens 240. For example, the first surface of the fourth lens 240 may be convex in a paraxial region of the first surface, and may be concave in an edge region of the first surface. The second surface of the fourth lens 240 may be concave in a paraxial region of the second surface, and may be convex in an edge region of the second surface.

The fifth lens 250 may have a positive refractive power, a first surface of the fifth lens 250 may be convex in a paraxial region of the first surface, and a second surface of the fifth lens 250 may be concave in a paraxial region of the second surface.

At least one inflection point may be formed on either one or both of the first surface and the second surface of the fifth lens 250. For example, the first surface of the fifth lens 250 may be convex in a paraxial region of the first surface, and may be concave in an edge region of the first surface. The second surface of the fifth lens 250 may be concave in a paraxial region of the second surface, and may be convex in an edge region of the second surface.

The sixth lens 260 may have a positive refractive power, a first surface of the sixth lens may be convex in a paraxial region of the first surface, and a second surface of the sixth lens 260 may be convex in a paraxial region of the second surface.

At least one inflection point may be formed on either one or both of the first surface and the second surface of the sixth lens 260. For example, the first surface of the sixth lens 260 may be convex in a paraxial region of the first surface, and may be concave in an edge region of the first surface. The second surface of the sixth lens 260 may be convex in a paraxial region of the second surface and may be concave in an edge region of the second surface.

The seventh lens 270 may have a negative refractive power, a first surface of the seventh lens 270 may be concave in a paraxial region of the first surface, and a second surface of the seventh lens 270 may be concave in a paraxial region of the second surface.

At least one inflection point may be formed on either one or both of the first surface and the second surface of the seventh lens 270. For example, the first surface of the seventh lens 270 may be concave in a paraxial region of the first surface, and may be convex in an edge region of the first surface. The second surface of the seventh lens 270 may be concave in a paraxial region of the second surface, and may be convex in an edge region of the second surface.

The surfaces of the first lens 210 to the seventh lens 270 may have the aspheric coefficients listed in Table 4 below. For example, each of an object-side surface and an image-side surface of each of the first lens 210 to the seventh lens 270 may be aspherical.

The second example of the optical imaging system illustrated in FIG. 3 configured according to Tables 3 and 4 above may have the aberration properties illustrated in FIG. 4.

Figure 5:
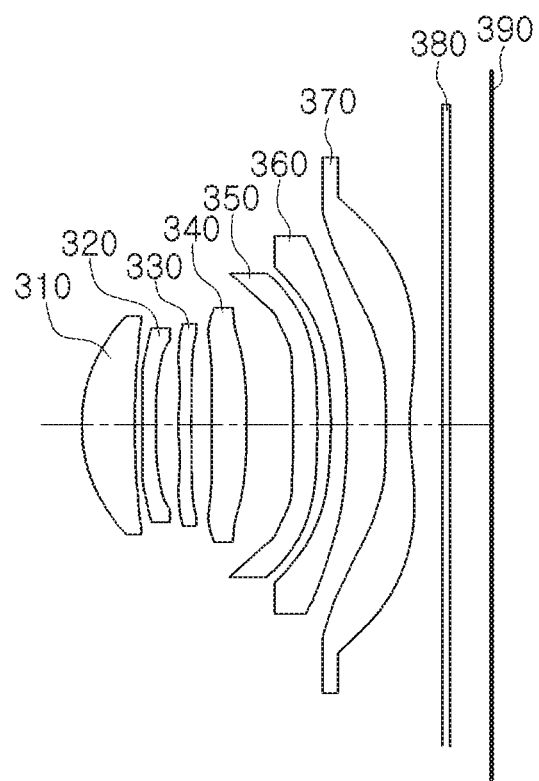
FIG. 5 is a diagram illustrating a third example of an optical imaging system.
Figure 6:
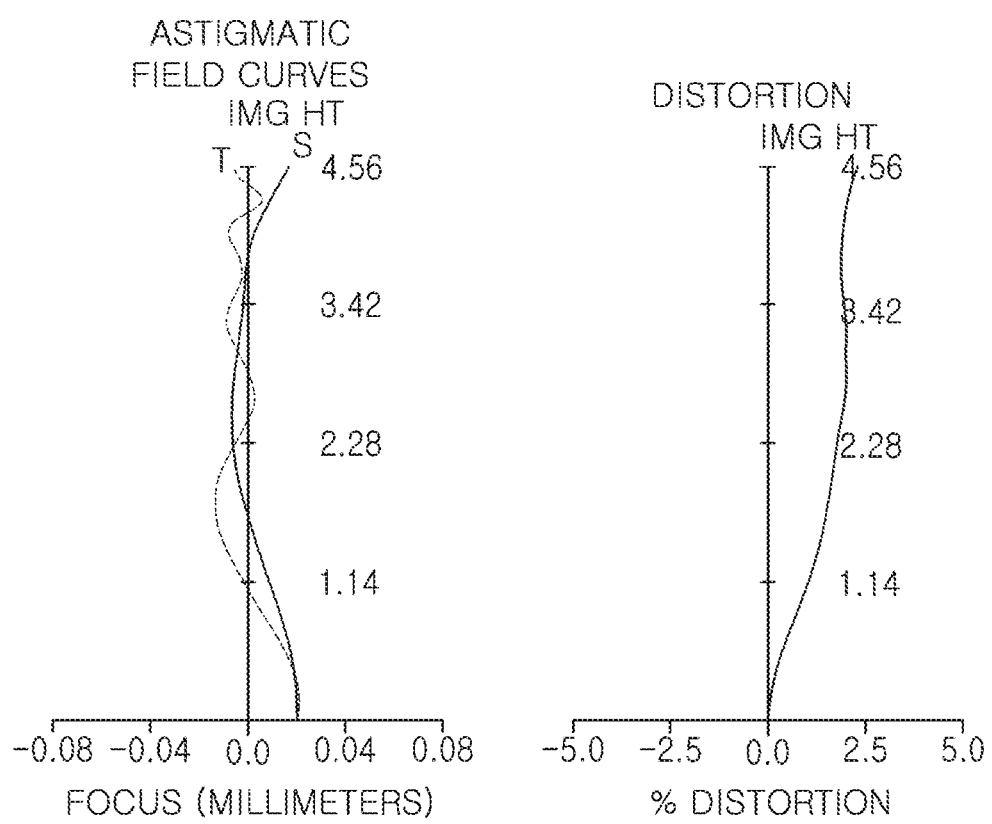
FIG. 6 is a diagram illustrating aberration properties of the optical imaging system illustrated in FIG. 5.

FIG. 5 is a diagram illustrating a third example of an optical imaging system, and FIG. 6 is a diagram illustrating aberration properties of the optical imaging system illustrated in FIG. 5.

The optical imaging system of the third example may include a first lens 310, a second lens 320, a third lens 330, a fourth lens 340, a fifth lens 350, a sixth lens 360, and a seventh lens 370 and may further include a stop, a filter 380, and an image sensor 390.

Characteristics of elements illustrated in FIG. 5, including radiuses of curvature of surfaces of elements, thicknesses of elements, distances between elements, refractive indexes of elements, Abbe numbers of elements, and focal lengths of elements, are listed in Table 5 below.

TABLE 4

|   | S1 | S2 | S3 | S4 | S5 | S6 | S7 |
|---|---|---|---|---|---|---|---|
| K | −1.048 | −21.819 | 16.835 | 11.583 | −11.465 | 5.970 | −79.619 |
| A | 0.008 | −0.106 | −0.153 | −0.038 | −0.002 | −0.025 | −0.026 |
| B | 0.027 | 0.119 | 0.268 | 0.185 | 0.004 | 0.129 | −0.052 |
| C | −0.069 | 0.101 | −0.170 | −0.375 | −0.163 | −0.706 | 0.227 |
| D | 0.114 | −0.420 | −0.109 | 0.431 | 0.390 | 1.852 | −0.623 |
| E | −0.116 | 0.537 | 0.295 | −0.310 | −0.415 | −2.706 | 0.949 |
| F | 0.072 | −0.371 | −0.243 | 0.144 | 0.240 | 2.377 | −0.856 |
| G | −0.026 | 0.145 | 0.100 | −0.042 | −0.070 | −1.238 | 0.457 |
| H | 0.005 | −0.030 | −0.020 | 0.007 | 0.006 | 0.349 | −0.132 |
| J | 0.000 | 0.003 | 0.002 | −0.001 | 0.001 | −0.041 | 0.016 |

|   | S8 | S9 | S10 | S11 | S12 | S13 | S14 |
|---|---|---|---|---|---|---|---|
| K | −99.000 | −22.463 | −24.850 | −55.438 | 43.550 | −8.774 | −99.000 |
| A | −0.057 | −0.036 | −0.039 | 0.027 | 0.039 | −0.083 | −0.050 |
| B | −0.002 | −0.006 | −0.018 | −0.065 | −0.041 | 0.034 | 0.015 |
| C | 0.094 | 0.037 | 0.056 | 0.043 | 0.018 | −0.008 | −0.003 |
| D | −0.289 | −0.038 | −0.051 | −0.023 | −0.006 | 0.001 | 0.000 |
| E | 0.394 | 0.016 | 0.024 | 0.009 | 0.002 | 0.000 | 0.000 |
| F | −0.302 | −0.003 | −0.006 | −0.002 | 0.000 | 0.000 | 0.000 |
| G | 0.134 | 0.000 | 0.001 | 0.000 | 0.000 | 0.000 | 0.000 |
| H | −0.032 | 0.000 | 0.000 | 0.000 | 0.000 | 0.000 | 0.000 |
| J | 0.003 | 0.000 | 0.000 | 0.000 | 0.000 | 0.000 | 0.000 |

TABLE 5

| Surface No. | Element | Radius of Curvature | Thickness or Distance | Refractive Index | Abbe Number | Focal Length |
|---|---|---|---|---|---|---|
| S1 | First | 1.830 | 0.806 | 1.546 | 56.1 | 3.972 |
| S2 | Lens | 9.862 | 0.115 | | | |
| S3 | Second | 127.068 | 0.206 | 1.689 | 18.4 | −9.14824 |
| S4 | Lens | 6.001 | 0.355 | | | |
| S5 | Third | 10.749 | 0.181 | 1.680 | 19.2 | −39.200 |
| S6 | Lens | 7.606 | 0.322 | | | |
| S7 | Fourth | Infinity | 0.516 | 1.669 | 20.4 | 17.46074 |
| S8 | Lens | −11.676 | 0.701 | | | |
| S9 | Fifth | 77.052 | 0.361 | 1.546 | 56.1 | 18.8306 |
| S10 | Lens | −11.858 | 0.208 | | | |
| S11 | Sixth | −6.355 | 0.248 | 1.621 | 25.8 | 120.6967 |
| S12 | Lens | −5.946 | 0.594 | | | |
| S13 | Seventh | −35.464 | 0.354 | 1.546 | 56.1 | −4.89062 |

TABLE 5-continued

| Surface No. | Element | Radius of Curvature | Thickness or Distance | Refractive Index | Abbe Number | Focal Length |
|---|---|---|---|---|---|---|
| S14 | Lens | 2.901 | 0.506 | | | |
| S15 | Filter | Infinity | 0.110 | 1.518 | 64.2 | |
| S16 | | Infinity | 0.638 | | | |
| S17 | Imaging Plane | Infinity | −0.020 | | | |

In the third example, a focal length f of the optical imaging system is 6.000 mm, Fno is 2.14, FOV is 73.59°, BFL is 1.234 mm, TTL is 6.200 mm, and IMG HT is 4.56 mm.

The definitions of Fno, FOV, BFL, TTL, and IMG HT are the same as in the first example.

In the third example, the first lens 310 may have a positive refractive power, a first surface of the first lens 310 may be convex, and a second surface of the first lens 310 may be concave.

The second lens 320 may have a negative refractive power, a first surface of the second lens 320 may be convex, and a second surface of the second lens 320 may be concave.

The third lens 330 may have a negative refractive power, a first surface of the third lens 330 may be convex in a paraxial region of the first surface, and a second surface of the third lens 330 may be concave in a paraxial region of the second surface.

At least one inflection point may be formed on either one or both of the first surface and the second surface of the third lens 330. For example, the first surface of the third lens 330 may be convex in a paraxial region of the first surface, and may be concave in an edge region of the first surface. The second surface of the third lens 330 may be concave in a paraxial region of the second surface, and may be convex in an edge region of the second surface.

The fourth lens 340 may have a positive refractive power, a first surface of the fourth lens 340 may be planar in a paraxial region of the first surface, and a second surface of the fourth lens 340 may be convex in a paraxial region of the second surface.

At least one inflection point may be formed on either one or both of the first surface and the second surface of the fourth lens 340. For example, the first surface of the fourth lens 340 may be planar in a paraxial region of the first surface, and may be convex in an edge region of the first surface.

The fifth lens 350 may have a positive refractive power, and a first surface and a second surface of the fifth lens 350 may be convex.

The sixth lens 360 may have a positive refractive power, a first surface of the sixth lens 360 may be concave, and a second surface of the sixth lens 360 may be convex.

The seventh lens 370 may have a negative refractive power, a first surface of the seventh lens may be concave in a paraxial region of the first surface, and a second surface of the seventh lens 370 may be concave in a paraxial region of the second surface.

At least one inflection point may be formed on either one or both of the first surface and the second surface of the seventh lens 370. For example, the first surface of the seventh lens 370 may be concave in a paraxial region of the first surface, and may be convex in an edge region of the first surface. The second surface of the seventh lens 370 may be concave in a paraxial region of the second surface, and may be convex in an edge region of the second surface.

The surfaces of the first lens 310 to the seventh lens 370 may have the aspheric coefficients listed in Table 6 below. For example, each of an object-side surface and an image-side surface of each of the first lens 310 to the seventh lens 370 may be aspherical.

TABLE 6

| | S1 | S2 | S3 | S4 | S5 | S6 | S7 |
|---|---|---|---|---|---|---|---|
| K | −0.841 | 26.507 | 15.248 | 6.857 | 0.000 | 0.000 | −95.502 |
| A | 0.019 | −0.011 | 0.017 | 0.019 | −0.123 | −0.131 | −0.064 |
| B | −0.008 | 0.055 | 0.078 | 0.022 | 0.087 | 0.141 | 0.013 |
| C | 0.039 | −0.131 | −0.180 | 0.064 | −0.056 | −0.174 | 0.014 |
| D | −0.072 | 0.195 | 0.288 | −0.227 | 0.170 | 0.362 | 0.006 |
| E | 0.077 | −0.185 | −0.292 | 0.378 | −0.293 | −0.467 | −0.024 |
| F | −0.047 | 0.107 | 0.184 | −0.332 | 0.266 | 0.353 | 0.021 |
| G | 0.015 | −0.034 | −0.063 | 0.156 | −0.124 | −0.146 | −0.008 |
| H | −0.002 | 0.004 | 0.009 | −0.030 | 0.023 | 0.025 | 0.001 |
| J | 0.000 | 0.000 | 0.000 | 0.000 | 0.000 | 0.000 | 0.000 |

| | S8 | S9 | S10 | S11 | S12 | S13 | S14 |
|---|---|---|---|---|---|---|---|
| K | −1.463 | 83.726 | 19.055 | 6.205 | 3.301 | 35.076 | −0.120 |
| A | −0.054 | −0.054 | −0.081 | −0.039 | 0.035 | −0.109 | −0.149 |
| B | 0.001 | 0.043 | 0.164 | 0.115 | −0.009 | 0.031 | 0.064 |
| C | 0.020 | −0.072 | −0.218 | −0.168 | −0.027 | −0.005 | −0.026 |
| D | −0.037 | 0.050 | 0.154 | 0.112 | 0.022 | 0.001 | 0.008 |
| E | 0.042 | −0.018 | −0.064 | −0.043 | −0.008 | 0.000 | −0.002 |
| F | −0.026 | 0.002 | 0.016 | 0.011 | 0.001 | 0.000 | 0.000 |
| G | 0.009 | 0.000 | −0.002 | −0.002 | 0.000 | 0.000 | 0.000 |
| H | −0.001 | 0.000 | 0.000 | 0.000 | 0.000 | 0.000 | 0.000 |
| J | 0.000 | 0.000 | 0.000 | 0.000 | 0.000 | 0.000 | 0.000 |

The third example of the optical imaging system illustrated in FIG. 5 configured according to Tables 5 and 6 above may have the aberration properties illustrated in FIG. 6.

Figure 7:
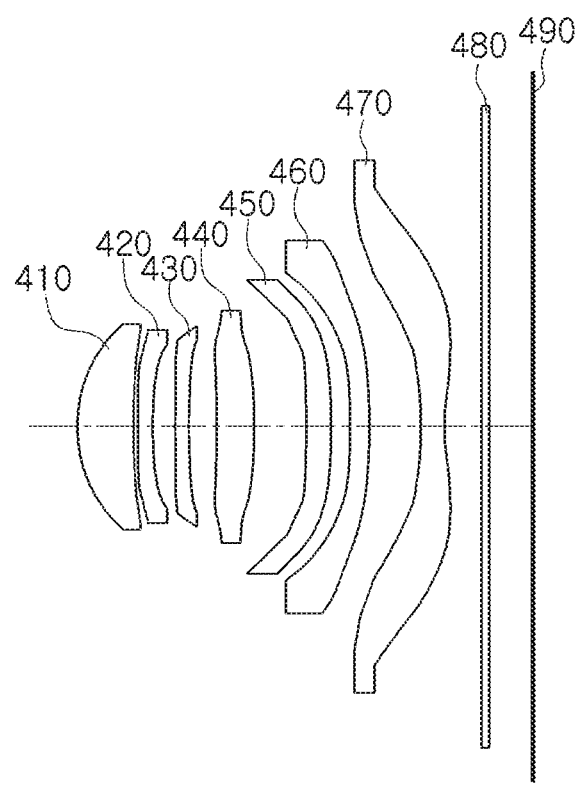
FIG. 7 is a diagram illustrating a fourth example of an optical imaging system.
Figure 8:
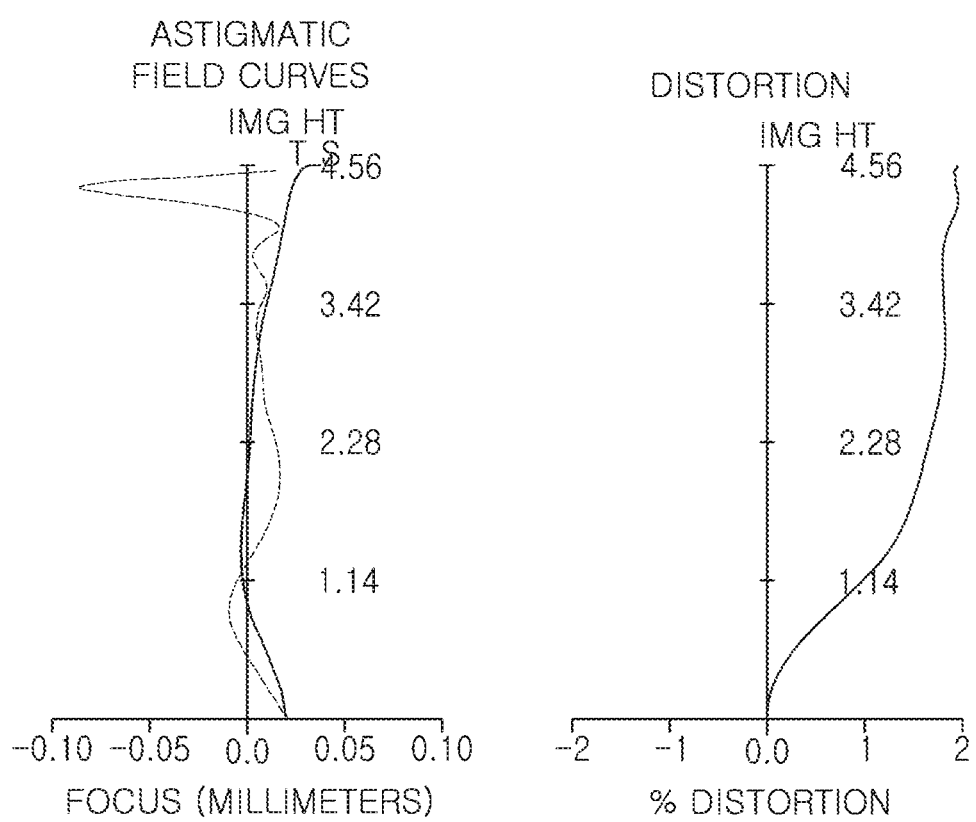
FIG. 8 is a diagram illustrating aberration properties of the optical imaging system illustrated in FIG. 7.

FIG. 7 is a diagram illustrating a fourth example of an optical imaging system, and FIG. 8 is a diagram illustrating aberration properties of the optical imaging system illustrated in FIG. 7.

The optical imaging system of the fourth example may include a first lens 410, a second lens 420, a third lens 430, a fourth lens 440, a fifth lens 450, a sixth lens 460, and a seventh lens 470 and may further include a stop, a filter 480, and an image sensor 490.

Characteristics of elements illustrated in FIG. 7, including radiuses of curvature of surfaces of elements, thicknesses of elements, distances between elements, refractive indexes of elements, Abbe numbers of elements, and focal lengths of elements, are listed in Table 7 below.

TABLE 7

| Surface No. | Element | Radius of Curvature | Thickness or Distance | Refractive Index | Abbe Number | Focal Length |
|---|---|---|---|---|---|---|
| S1 | First | 1.827 | 0.768 | 1.546 | 56.1 | 3.998 |
| S2 | Lens | 9.512 | 0.066 | | | |
| S3 | Second | 120.115 | 0.203 | 1.680 | 19.2 | −10.1838 |
| S4 | Lens | 6.538 | 0.304 | | | |
| S5 | Third | 7.720 | 0.182 | 1.680 | 19.2 | −20.076 |
| S6 | Lens | 4.883 | 0.380 | | | |
| S7 | Fourth | 30.302 | 0.506 | 1.669 | 20.4 | 14.26375 |
| S8 | Lens | −13.826 | 0.701 | | | |
| S9 | Fifth | 44.211 | 0.340 | 1.546 | 56.1 | 16.67144 |
| S10 | Lens | −11.445 | 0.271 | | | |
| S11 | Sixth | −5.957 | 0.250 | 1.621 | 25.8 | −290.909 |
| S12 | Lens | −6.259 | 0.696 | | | |
| S13 | Seventh | −36.032 | 0.335 | 1.546 | 56.1 | −5.00505 |
| S14 | Lens | 2.970 | 0.505 | | | |
| S15 | Filter | Infinity | 0.110 | 1.518 | 64.2 | |
| S16 | | Infinity | 0.601 | | | |
| S17 | Imaging Plane | Infinity | −0.020 | | | |

In the fourth example, a focal length f of the optical imaging system is 6.000 mm, Fno is 2.20, FOV is 74.55°, BFL is 1.196 mm, TTL is 6.200 mm, and IMG HT is 4.56 mm.

The definitions of Fno, FOV, BFL, TTL, and IMG HT are the same as in the first example.

In the fourth example, the first lens 410 may have a positive refractive power, a first surface of the first lens 410 may be convex, and a second surface of the first lens 410 may be concave.

The second lens 420 may have a negative refractive power, a first surface of the second lens 420 may be convex, and a second surface of the second lens 420 may be concave.

The third lens 430 may have a negative refractive power, a first surface of the third lens 430 may be convex in a paraxial region of the first surface, and a second surface of the third lens 430 may be concave.

At least one inflection point may be formed on either one or both of the first surface and the second surface of the third lens 430. For example, the first surface of the third lens 430 may be convex in a paraxial region of the first surface, and may be concave in an edge region of the first surface.

The fourth lens 440 may have a positive refractive power, and a first surface and a second surface of the fourth lens 440 may be convex.

The fifth lens 450 may have a positive refractive power, and a first surface and a second surface of the fifth lens 450 may be convex.

The sixth lens 460 may have a negative refractive power, a first surface of the sixth lens 460 may be concave, and a second surface of the sixth lens 460 may be convex.

The seventh lens 470 may have a negative refractive power, a first surface of the seventh lens 470 may be concave in a paraxial region of the first surface, and a second surface of the seventh lens 470 may be concave in a paraxial region of the second surface.

At least one inflection point may be formed on either one or both of the first surface and the second surface of the seventh lens 470. For example, the first surface of the seventh lens 470 may be concave in a paraxial region of the first surface, and may be convex in an edge region of the first surface. The second surface of the seventh lens 470 may be concave in a paraxial region of the second surface, and may be convex in an edge region of the second surface.

The surfaces of the first lens 410 to the seventh lens 470 may have the aspheric coefficients listed in Table 8 below. For example, each of an object-side surface and an image-side surface of each of the first lens 410 to the seventh lens 470 may be aspherical.

TABLE 8

| | S1 | S2 | S3 | S4 | S5 | S6 | S7 |
|---|---|---|---|---|---|---|---|
| K | −0.826 | 26.805 | −99.000 | 6.347 | 0.000 | 0.000 | −95.502 |
| A | 0.010 | −0.026 | −0.004 | −0.006 | −0.144 | −0.149 | −0.057 |
| B | 0.053 | 0.085 | 0.138 | 0.167 | 0.081 | 0.203 | −0.002 |
| C | −0.164 | −0.102 | −0.160 | −0.394 | 0.359 | −0.232 | 0.089 |
| D | 0.328 | 0.051 | −0.002 | 0.809 | −1.374 | 0.379 | −0.191 |
| E | −0.408 | 0.027 | 0.263 | −1.276 | 2.653 | −0.503 | 0.251 |
| F | 0.319 | −0.081 | −0.381 | 1.426 | −3.071 | 0.448 | −0.205 |
| G | −0.152 | 0.071 | 0.270 | −1.024 | 2.121 | −0.249 | 0.101 |

TABLE 8-continued

| | | | | | | | |
|---|---|---|---|---|---|---|---|
| H | 0.040 | −0.028 | −0.097 | 0.423 | −0.802 | 0.078 | −0.028 |
| J | −0.005 | 0.004 | 0.014 | −0.076 | 0.128 | −0.011 | 0.003 |

| | S8 | S9 | S10 | S11 | S12 | S13 | S14 |
|---|---|---|---|---|---|---|---|
| K | −4.999 | 71.505 | 18.748 | 5.407 | 3.770 | −52.747 | −0.156 |
| A | −0.064 | −0.055 | −0.067 | −0.012 | 0.046 | −0.082 | −0.122 |
| B | 0.065 | 0.028 | 0.106 | 0.042 | −0.028 | −0.001 | 0.035 |
| C | −0.172 | −0.013 | −0.112 | −0.070 | −0.016 | 0.015 | −0.008 |
| D | 0.305 | −0.039 | 0.041 | 0.028 | 0.020 | −0.007 | 0.001 |
| E | −0.340 | 0.055 | 0.009 | 0.004 | −0.008 | 0.002 | 0.000 |
| F | 0.241 | −0.033 | −0.013 | −0.007 | 0.002 | 0.000 | 0.000 |
| G | −0.105 | 0.010 | 0.005 | 0.002 | 0.000 | 0.000 | 0.000 |
| H | 0.026 | −0.002 | −0.001 | 0.000 | 0.000 | 0.000 | 0.000 |
| J | −0.003 | 0.000 | 0.000 | 0.000 | 0.000 | 0.000 | 0.000 |

The fourth example of the optical imaging system illustrated in FIG. 7 configured according to Tables 7 and 8 above may have the aberration properties illustrated in FIG. 8.

Figure 9:
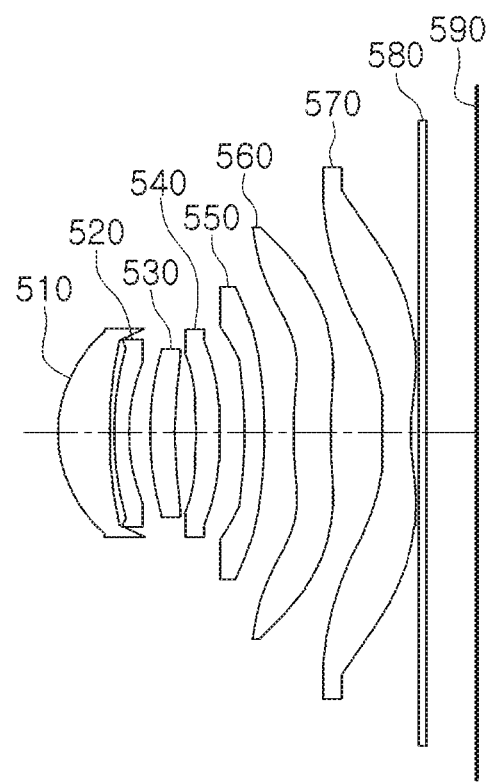
FIG. 9 is a diagram illustrating a fifth example of an optical imaging system.
Figure 10:
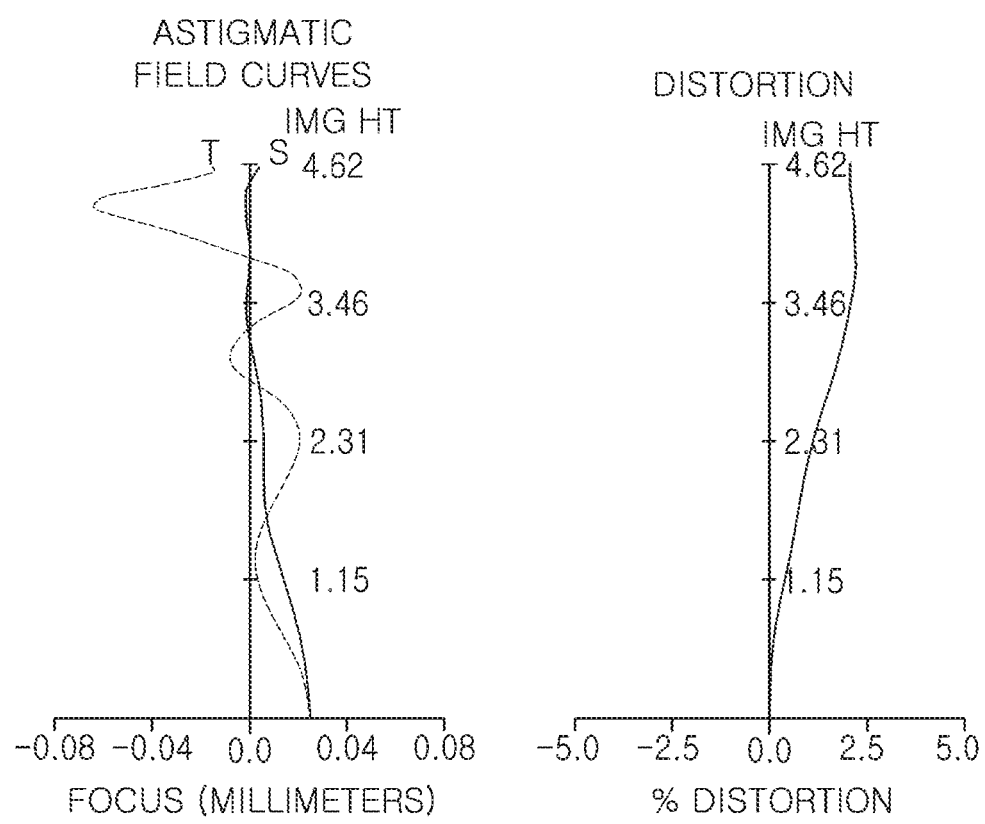
FIG. 10 is a diagram illustrating aberration properties of the optical imaging system illustrated in 9.

FIG. 9 is a diagram illustrating a fifth example of an optical imaging system, and FIG. 10 is a diagram illustrating aberration properties of the optical imaging system illustrated in FIG. 9.

The optical imaging system of the fifth example may include a first lens 510, a second lens 520, a third lens 530, a fourth lens 540, a fifth lens 550, a sixth lens 560, and a seventh lens 570 and may further include a stop, a filter 580, and an image sensor 590.

Characteristics of elements illustrated in FIG. 9, including radiuses of curvature of surfaces of elements, thicknesses of elements, distances between elements, refractive indexes of elements, Abbe numbers of elements, and focal lengths of elements, are listed in Table 9 below.

TABLE 9

| Surface No. | Element | Radius of Curvature | Thickness or Distance | Refractive Index | Abbe Number | Focal Length |
|---|---|---|---|---|---|---|
| S1 | First | 1.92 | 0.801 | 1.546 | 56.1 | 4.441 |
| S2 | Lens | 8.12 | 0.038 | | | |
| S3 | Second | 5.64 | 0.222 | 1.679 | 19.2 | −10.1615 |
| S4 | Lens | 3.05 | 0.312 | | | |
| S5 | Third | 4.92 | 0.361 | 1.537 | 55.7 | 53.677 |
| S6 | Lens | 5.78 | 0.314 | | | |
| S7 | Fourth | 53.368601 | 0.351 | 1.679 | 19.2 | −187.783 |
| S8 | Lens | 37.52 | 0.383 | | | |
| S9 | Fifth | −289.96 | 0.280 | 1.620 | 26.0 | −368.835 |
| S10 | Lens | 1082.57 | 0.428 | | | |
| S11 | Sixth | 4.56 | 0.553 | 1.571 | 37.4 | 14.07256 |
| S12 | Lens | 10.07 | 0.756 | | | |
| S13 | Seventh | 16.09 | 0.434 | 1.537 | 55.7 | −5.40772 |
| S14 | Lens | 2.44 | 0.132 | | | |
| S15 | Filter | Infinity | 0.110 | 1.518 | 64.2 | |
| S16 | | Infinity | 0.747 | | | |
| S17 | Imaging Plane | Infinity | −0.024 | | | |

In the fifth example, a focal length f of the optical imaging system is 5.870 mm, Fno is 2.27, FOV is 75.52°, BFL is 0.965 mm, TTL is 6.197 mm, and IMG HT is 4.62 mm.

The definitions of Fno, FOV, BFL, TTL, and IMG HT are the same as in the first example.

In the fifth example, the first lens 510 may have a positive refractive power, a first surface of the first lens 510 may be convex, and a second surface of the first lens 510 may be concave.

The second lens 520 may have a negative refractive power, a first surface of the second lens 520 may be convex, and a second surface of the second lens 520 may be concave.

The third lens 530 may have a positive refractive power, a first surface of the third lens 530 may be convex, and a second surface of the third lens 530 may be concave.

The fourth lens 540 may have a negative refractive power, a first surface of the fourth lens 540 may be convex in a paraxial region of the first surface, and a second surface of the fourth lens 540 may be concave in a paraxial region of the second surface.

At least one inflection point may be formed on either one or both of the first surface and the second surface of the fourth lens 540. For example, the first surface of the fourth lens 540 may be convex in a paraxial region of the first surface, and may be concave in an edge region of the first surface. The second surface of the fourth lens 540 may be concave in a paraxial region of the second surface, and may be convex in an edge region of the second surface.

The fifth lens 550 may have a negative refractive power, a first surface of the fifth lens 550 may be concave, and a second surface of the fifth lens 550 may be concave.

The sixth lens 560 may have a positive refractive power, a first surface of the sixth lens 560 may be convex in a paraxial region of the first surface, and a second surface of the sixth lens 560 may be concave in a paraxial region of the second surface.

At least one inflection point may be formed on either one or both of the first surface and the second surface of the sixth lens 560. For example, the first surface of the sixth lens 560 may be convex in a paraxial region of the first surface, and may be concave in an edge region of the first surface. The second surface of the sixth lens 560 may be concave in a paraxial region of the second surface, and may be convex in an edge region of the second surface.

The seventh lens 570 may have a negative refractive power, a first surface of the seventh lens 570 may be convex in a paraxial region of the first surface, and a second surface of the seventh lens 570 may be concave in a paraxial region of the second surface.

At least one inflection point may be formed on either one or both of the first surface and the second surface of the seventh lens 570. For example, the second surface of the seventh lens 570 may be concave in a paraxial region of the second surface, and may be convex in an edge region of the second surface.

The surfaces of the first lens 510 to the seventh lens 570 may have the aspheric coefficients listed in Table 10 below. For example, each of an object-side surface and an image-side surface of each of the first lens 510 to the seventh lens 570 may be aspherical.

TABLE 10

|   | S1 | S2 | S3 | S4 | S5 | S6 | S7 |
|---|---|---|---|---|---|---|---|
| K | −0.215 | −0.003 | 7.439 | 3.547 | 0.006 | 0.017 | −0.451 |
| A | 0.003 | −0.002 | −0.013 | −0.007 | −0.011 | 0.003 | −0.050 |
| B | 0.009 | 0.057 | 0.106 | −0.101 | 0.079 | −0.244 | −0.051 |
| C | −0.029 | −0.264 | −0.529 | 0.667 | −0.544 | 1.268 | 0.132 |
| D | 0.063 | 0.605 | 1.366 | −2.189 | 1.803 | −3.391 | −0.263 |
| E | −0.078 | −0.810 | −2.046 | 4.103 | −3.351 | 5.242 | 0.312 |
| F | 0.059 | 0.659 | 1.857 | −4.577 | 3.697 | −4.852 | −0.221 |
| G | −0.026 | −0.320 | −1.003 | 3.015 | −2.396 | 2.648 | 0.091 |
| H | 0.006 | 0.085 | 0.297 | −1.082 | 0.844 | −0.783 | −0.020 |
| J | −0.001 | −0.010 | −0.037 | 0.163 | −0.125 | 0.096 | 0.002 |

|   | S8 | S9 | S10 | S11 | S12 | S13 | S14 |
|---|---|---|---|---|---|---|---|
| K | −0.122 | 0.005 | 0.000 | −0.005 | 0.188 | 0.424 | −16.203 |
| A | −0.032 | −0.050 | −0.064 | −0.046 | 0.005 | −0.154 | −0.081 |
| B | −0.140 | 0.002 | 0.001 | −0.018 | −0.038 | 0.063 | 0.028 |
| C | 0.343 | 0.007 | 0.021 | 0.010 | 0.019 | −0.015 | −0.006 |
| D | −0.486 | −0.010 | −0.013 | −0.003 | −0.006 | 0.002 | 0.001 |
| E | 0.416 | 0.006 | 0.004 | 0.001 | 0.001 | 0.000 | 0.000 |
| F | −0.222 | −0.002 | −0.001 | 0.000 | 0.000 | 0.000 | 0.000 |
| G | 0.073 | 0.000 | 0.000 | 0.000 | 0.000 | 0.000 | 0.000 |
| H | −0.013 | 0.000 | 0.000 | 0.000 | 0.000 | 0.000 | 0.000 |
| J | 0.001 | 0.000 | 0.000 | 0.000 | 0.000 | 0.000 | 0.000 |

The fifth example of the optical imaging system illustrated in FIG. 9 configured according to Tables 9 and 10 above may have the aberration properties illustrated in FIG. 10.

Table 11 below lists values of Conditional Expressions 1 to 11 in the first to fifth examples.

TABLE 11

| Conditional Expression | First Example | Second Example | Third Example | Fourth Example | Fifth Example |
|---|---|---|---|---|---|
| f/f2 + f/f3 | −0.44 | −0.49 | −0.81 | −0.89 | −0.47 |
| v1 − v2 | 44.35 | 30.29 | 37.68 | 36.85 | 36.85 |
| TTL/f | 1.08 | 1.03 | 1.03 | 1.03 | 1.06 |
| n2 + n3 | 3.36 | 3.31 | 3.37 | 3.36 | 3.22 |
| BFL/f | 0.158 | 0.151 | 0.206 | 0.199 | 0.164 |
| D1/f | 0.032 | 0.010 | 0.019 | 0.011 | 0.007 |
| R1/f | 0.372 | 0.327 | 0.305 | 0.305 | 0.327 |
| TTL/(2 * IMG HT) | 0.6799 | 0.6800 | 0.6798 | 0.6798 | 0.6707 |
| Fno | 2.01 | 2.18 | 2.14 | 2.20 | 2.27 |
| n2 + n3 + n4 | 4.905 | 4.99 | 5.04 | 5.03 | 4.90 |
| |f23|/f1 | 2.448 | 2.374 | 1.838 | 1.655 | 2.780 |

According to the examples described above, an optical imaging system may have a reduced size and an increased focal length. The increased focal length enables the optical imaging system to have a high resolution.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
    a first lens having a positive refractive power, a convex object-side surface, and a concave image-side surface;
    a second lens having a negative refractive power, a convex object-side surface, and a concave image-side surface;
    a third lens having a positive refractive power;

a fourth lens having a negative refractive power, a convex object-side surface, and a concave image-side surface;
a fifth lens having a negative refractive power;
a sixth lens having a positive refractive power; and
a seventh lens having a negative refractive power,
wherein the first to seventh lenses are sequentially disposed in ascending numerical order along an optical axis of the optical imaging system from an object side of the optical imaging system toward an imaging surface of an image sensor,
wherein a conditional expression TTL/(2*IMG HT)<0.69 is satisfied, where TTL is a distance along the optical axis from an object-side surface of the first lens to the imaging surface of the image sensor, and IMG HT is one-half of a diagonal length of the imaging surface of the image sensor and
wherein the optical imaging system has a total of seven lenses.

2. The optical imaging system of claim 1, wherein a conditional expression n2+n3>3.15 is satisfied, where n2 is a refractive index of the second lens, and n3 a refractive index of the third lens.

3. The optical imaging system of claim 2, wherein a conditional expression n2+n3+n4>4.85 is satisfied, where n4 is a refractive index of the fourth lens.

4. The optical imaging system of claim 2, wherein a conditional expression v1−v2>30 is satisfied, where v1 is an Abbe number of the first lens, and v2 is an Abbe number of the second lens.

5. The optical imaging system of claim 1, wherein a conditional expression 1.0<TTL/f<1.10 is satisfied.

6. The optical imaging system of claim 1, wherein a conditional expression 0.15<BFL/f<0.25 is satisfied, where BFL is a distance along the optical axis from an image-side surface of the seventh lens to the imaging surface of the image sensor.

7. The optical imaging system of claim 1, wherein a conditional expression 0.005<D1/f<0.04 is satisfied, where D1 is a distance along the optical axis between an image-side surface of the first lens and an object-side surface of the second lens.

8. The optical imaging system of claim 1, wherein a conditional expression 0.30<R1/f<0.40 is satisfied, where R1 is a radius of curvature of an object-side surface of the first lens.

9. The optical imaging system of claim 1, wherein a conditional expression 1.4<|f23|/f1<2.8 is satisfied, where f1 is a focal length of the first lens, and f23 is a composite focal length of the second lens and the third lens.

10. The optical imaging system of claim 1, wherein a conditional expression Fno<2.3 is satisfied, where Fno is an F-number of the optical imaging system.

11. The optical imaging system of claim 1, wherein a refractive index of each of at least two lenses of the first to seventh lenses is 1.67 or higher.

12. The optical imaging system of claim 1, wherein a refractive index of each of the either one or both of the second lens and the third lens is 1.67 or higher.

13. The optical imaging system of claim 1, wherein the seventh lens has a negative refractive power.

14. An optical imaging system comprising:
a first lens, a second lens, a third lens, a fourth lens, a fifth lens, a sixth lens, and a seventh lens sequentially disposed in ascending numerical order along an optical axis of the optical imaging system from an object side of the optical imaging system toward an imaging surface of an image sensor,
wherein the first lens has a positive refractive power, the second lens has a negative refractive power, the third lens has a negative refractive power, the fourth lens has a positive refractive power, and the seventh lens has a negative refractive power,
wherein a conditional expression n2+n3>3.15 is satisfied, where n2 is a refractive index of the second lens, and n3 is a refractive index of the third lens,
wherein a conditional expression TTL/(2*IMG HT)<0.69 is satisfied, where TTL is a distance along the optical axis from an object-side surface of the first lens to the imaging surface of the image sensor, and IMG HT is one-half of a diagonal length of the imaging surface of the image sensor,
wherein a conditional expression f/f2+f/f3<−0.4 is satisfied, where f is a focal length of the optical imaging system, f2 is a focal length of the second lens, and f3 is a focal length of the third lens,
wherein a conditional expression v1−v2>30 is satisfied, where v1 is an Abbe number of the first lens, and v2 is an Abbe number of the second lens, and
wherein the optical imaging system has a total of seven lenses.

15. The optical imaging system of claim 14, wherein a conditional expression n2+n3+n4>4.85 is satisfied, where n4 is a refractive index of the fourth lens.

* * * * *